3,480,957
INTERFEROMETER RADAR MOVING
TARGET INDICATOR
Lester H. Kosowsky, Norwalk, Conn., assignor to United
Aircraft Corporation, East Hartford, Conn., a corporation of Delaware
Filed Aug. 2, 1967, Ser. No. 657,997
Int. Cl. G01s 9/02
U.S. Cl. 343—16                2 Claims

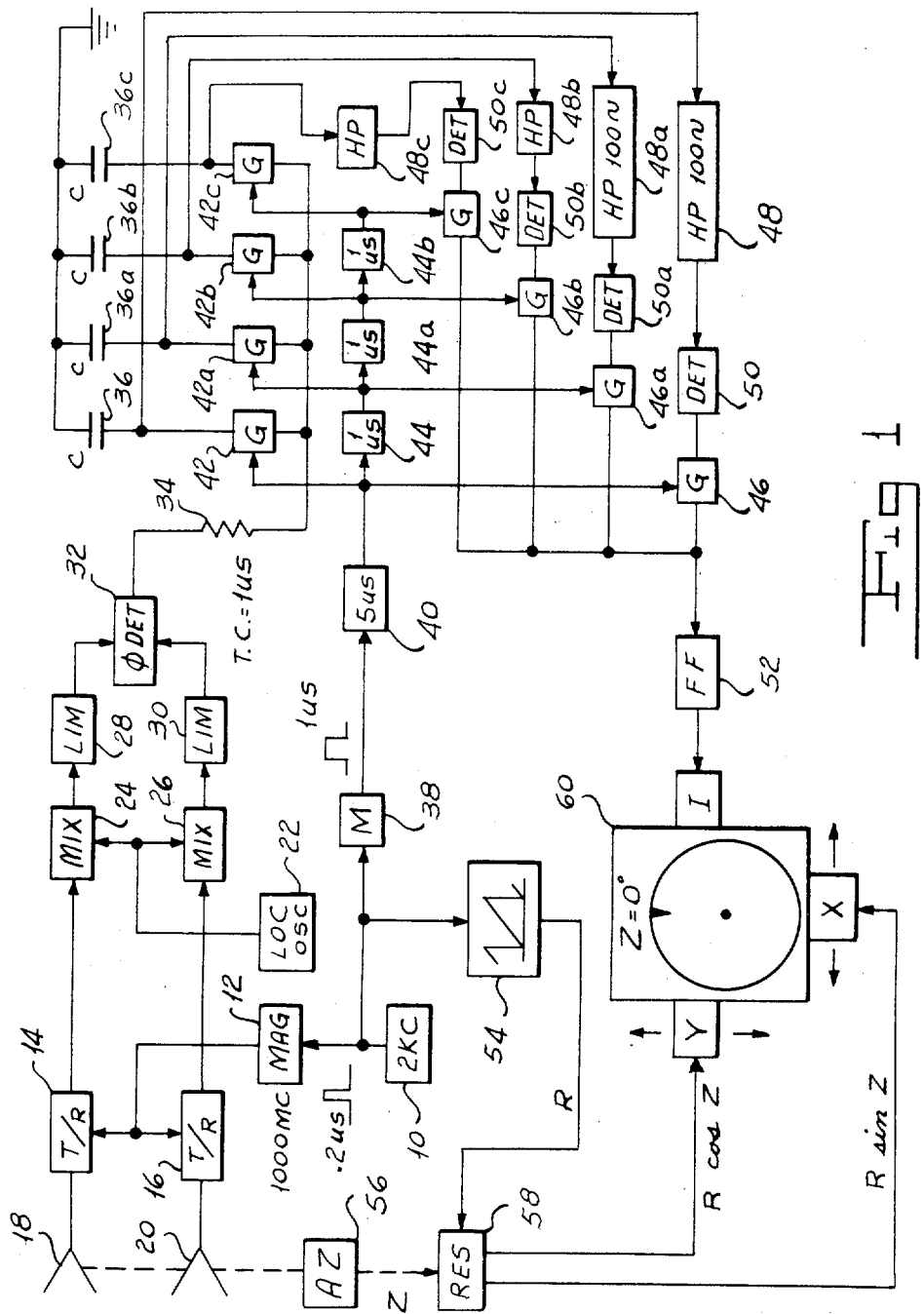

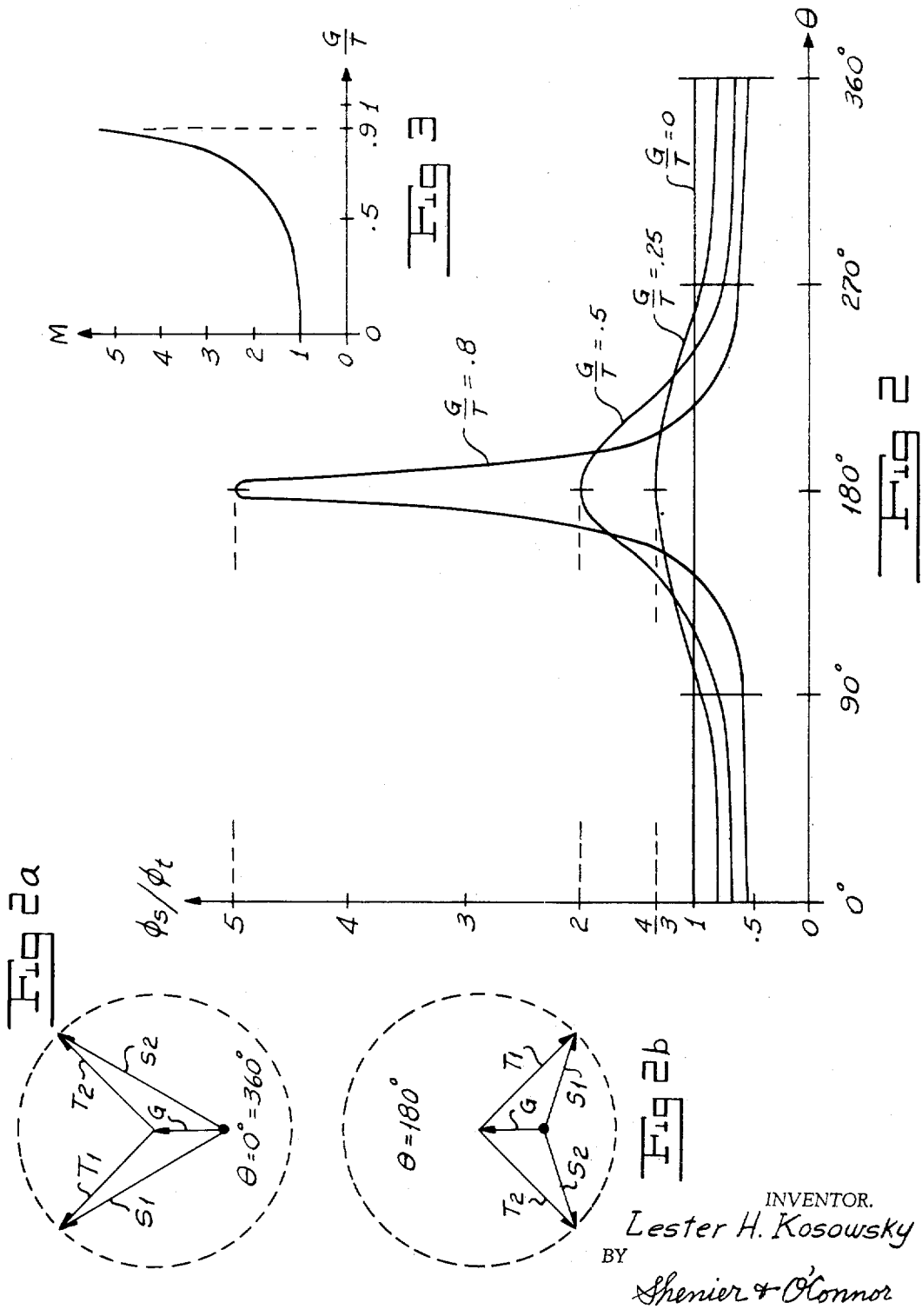

ABSTRACT OF THE DISCLOSURE

In general, my invention contemplates the provision of an interferometer radar system having a pair of spaced receiving horns, the signals from which are impressed upon a phase detector. The output of the phase detector is coupled to a comb filter comprising a plurality of range-gated capacitors. The various capacitor outputs are coupled to corresponding high-pass filters which sense variations in the indicated angular position of the target occasioned by motion of such target relative to the ground which provides a simultaneous return at some angle different from that of the target. The outputs of the various highpass filters are detected and then range-gated to control the intensity input of a display tube.

BACKGROUND OF THE INVENTION

In the prior art, non-coherent moving target indicators have been provided which are amplitude sensitive. As a target moves over the ground, the phase angle between the radar returns varies, thus producing both an amplitude and a phase variation in the composite received signal. In moving target indicators of the prior art, an amplitude sensitive detector senses the amplitude modulation component in the composite received signal. The index of amplitude modulation is proportional to the ratio of the ground return to the target return, if the target return exceeds that from the ground. If the ground return exceeds that of the target, then the amplitude modulation index is the ratio of target return to ground return.

SUMMARY OF THE INVENTION

One object of my invention is to provide a moving target indicator which responds to phase variations rather than amplitude variations.

Another object of my invention is to provide a moving target indicator for a phase interferometer radar system.

A further object of my invention is to provide a moving target indicator which provides a greatly enhanced response when the amplitudes of the target return and the ground return approach equality.

Other and further objects of my invention will appear from the following description.

DESCRIPTION OF THE DRAWINGS

FIGURE 1 is a schematic view illustrating a preferred embodiment of my invention.

FIGURE 2 is a graph showing one cycle of apparent variation in the space angle for various amplitude ratios of ground return to target return.

FIGURE 2a is a diagram illustrating an aligned orientation of vectors producing a minimum in apparent space angle.

FIGURE 2b is a diagram illustrating an opposed orientation of vectors producing a maximum in apparent space angle.

FIGURE 3 is a graph showing the normalized difference between maximum and minimum space angle deviations as a function of the ratio of the amplitude of ground and target returns.

DESCRIPTION OF THE PREFERRED EMBODIMENT

Referring now to FIGURE 1, a free-running multivibrator 10 provides output pulses of .2 microsecond duration at a 2 kc. rate. The output of multivibrator 10 drives a magnetron 12 which produces corresponding output pulses at a frequency of 1000 mc. Magnetron 12 is coupled to respective transmit-receive devices 14 and 16. Devices 14 and 16 are coupled to respective antennas 18 and 20 and to respective mixers 24 and 26. The output of a local oscillator 22 is also applied to mixers 24 and 26. The outputs of these mixers are coupled through respective limiters 28 and 30 to a phase detector 32. The output of phase detector 32 is connected to one terminal of a resistor 34. The other terminal of resistor 34 is coupled through respective gates 42, 42a, 42b, and 42c to one terminal of respective capacitors 36, 36a, 36b, and 36c. The other terminal of each of capacitors 36 through 36c is grounded. The ungrounded terminals of capacitors 36 through 36c are coupled to respective high-pass filter circuits 48, 48a, 48b, and 48c, which may have a cut-off frequency of 100 cycles per second. The outputs of filters 48 through 48c are connected to respective detectors 50, 50a, 50b, and 50c. The outputs of detectors 50 through 50c are coupled through respective gates 46, 46a, 46b, and 46c to a flip-flop 52. The output of free-running multivibrator 10 is applied to a monostable multivibrator 38 which provides pulses of 1 microsecond duration. The output of multivibrator 38 is applied to a 5 μs. delay network 40. The output of network 40 enables gates 42 and 46 and is further coupled to a 1 μs. delay network 44. The output of network 44 enables gates 42a and 46a and is further applied to a 1 μs. delay network 44a. The output of network 44a enables gates 42b and 46b and is further applied to a 1 μs. delay network 44b, the output of which enables gates 42c and 46c. The output of multivibrator 10 is applied to the retrace input of a sawtooth generator 54 which provides a ramp function output proportioned to the range R from which signals are returned to the antennas 18 and 20. The antennas are rotated or oscillated in azimuth by a mechanism 56 which synchronously drives the rotor of a resolver 58 in accordance with the azimuth angle Z. The output of sawtooth generator 54 is coupled to the stator of resolver 58. The resolver may comprise a card provided with a resistive winding which is contacted by two pairs of orthogonally disposed brushes. Resolver 58 provides $R \cos Z$ and $R \sin Z$ outputs which are applied to the respective Y and X deflection inputs of a cathode ray tube 60. The output of flip-flop 52 is applied to the intensity control input of display tube 60.

It will be appreciated that the period between successive magnetron pulses is 500 μs. Accordingly, the number of comb-filtering capacitors 36 will be 495 instead of only four as shown. Hence, the number of gates 42, delay line networks 44, gates 46, high-pass filters 48, and detectors 50 must be correspondingly increased.

In operation of my invention, pulses transmitted by magnetron 12 are reflected from the ground and from targets. Composite signals are received by spaced antennas 18 and 20 and, after frequency conversion and limiting, are applied to phase detector 32. During each range sweep, the gates 42 are successively enabled for 1 μs intervals to successively couple the output of phase detector 32 to capacitors 36. After each transmitted pulse, the various capacitors 36 are charged in accordance with the space angle of the composite return at successive range increments. If a target at a certain range is moving, then that capacitor 36 corresponding to such range will exhibit a voltage variation from pulse to pulse which passes through one cycle when the target moves through a radial distance corresponding to one-half wave length of the transmitted signal.

For a transmitted frequency of 1000 mc, the wave length is .3 meter; and a radial target displacement of .15 meter will produce one full cycle of variation. Accordingly, a radial target motion of 15 meters per second or approximately 30 miles per hour will yield a variational component of 100 cycles per second.

Accordingly, if the moving target, such as an aircraft, has a radial velocity greater than 30 miles per hour, that capacitor 36 corresponding to the range of the target will exhibit a voltage variation at a frequency exceeding 100 cycles per second. This output passes through the corresponding one of high-pass filters 48 and operates the corresponding one of detectors 50. The same output of the delay line 44 which actuates the corresponding gate 42 also actuates the corresponding gate 46 to pass the output of the detector to flip-flop 52. The flip-flop has a certain hysteresis which requires a detector output of a predetermined amplitude for actuating the flip-flop. The intensity input of tube 60 to thus actuated at a time and hence at a range corresponding to that of the moving target.

Referring now to FIGURE 2a, it is assumed that the ratio of ground return to target return is .5 and that the target has such elevation angle that the phase shift between the target returns T1 and T2 received by the antennas 18 and 20 is 90°. It is further assumed that the ground return G has an elevation angle of 0° so that there is no phase shift between the ground returns received by antennas 18 and 20. In FIGURE 2a the target returns are shown in an aligned orientation with the ground return. This corresponds to θ=0° The composite signals S1 and S2 received by the antennas have a phase shift which is somewhat less than 90°.

FIGURE 2b shows the summation where the vectors are opposed corresponding to θ=180°. It will be noted that the phase shift between the composite received signals S1 and S2 is appreciably greater than 90°.

It can be shown in the θ=0° orientation of the ground and target returns that $$\phi s/\phi t = \frac{1}{1+G/T}$$

where $\phi s$ is the phase angle difference between the signals S1 and S2 and where $\phi t$ is the phase angle difference between the target return signals T1 and T2.

In the θ=180° orientation of the ground and target returns, it can be shown that $$\phi s/\phi t = \frac{1}{1-G/T}$$

FIGURE 2 shows $\phi s/\phi t$ as a function of $\theta$ for ratios of G/T of 0, .25, .5, and .8. If there is no ground return (G/T=0), then the phase angle between the signals S1 and S2 is always equal to the phase angle between the target return signals T1 and T2; and no variational component results with target motion. For small ratios of ground to target return (G/T=.25), the variational component exhibits an approximately sinusoidal variation with but a small augmentation in the response for θ=180°. However, for large ratios of ground to target return (G/T=.8), the variational component departs radically from a sinusoidal wave form and exhibits a greatly augmented peak at θ=180°.

In a conventional amplitude modulation detecting moving target indicator, the variational component is substantially sinusoidal for all ratios of ground to target return between zero and unity; and the maximum variational component when the ground and target returns are in phase alignment is $+G/T$, while the minimum variational component when the returns are in phase opposition is $-G/T$.

FIGURE 3 shows the ratio M of the difference between the maximum and minimum variational components in my interferometer system to the difference between the maximum and minimum variational components in conventional amplitude detecting systems as a function of the ratio of ground to target return G/T. It will be appreciated that $$M = \frac{\frac{1}{1-G/T} - \frac{1}{1+G/T}}{2G/T}$$

It will be noted that for smal values of G/T, my system offers some improvements over conventional systems. However, for values of G/T approaching unity, my system offers a greatly enhanced response over that of conventional systems. For G/T=.5, the response is enhanced by a factor of 1.33; for G/T=.8, the response is enhanced by a factor of 2.78; and for G/T=.9, the factor of enhanced response is 5.26. If G/T=1, then the phase angle deviation between S1 and S2 at θ=180° will be $\phi s = 180°$, even though the phase angle deviation $\phi t$ between T1 and T2 approaches zero. Thus, for G/T=1, the factor of enhanced response is extremely large and is inversely proportional to the phase angle difference between the target returns T1 and T2.

It will be seen that I have accomplished the objects of my invention. My moving target indicator responds to phase variation rather than amplitude variations and employs a phase interferometer system. The response of my system is greatly enhanced when the amplitudes of the ground and target returns approach equality.

It will be understood that certain features and subcombinations are of utility and may be employed without reference to other features and subcombinations. This is contemplated by and is within the scope of my claims. It is further obvious that various changes be made in details within the scope of my claims without departing from the spirit of my invention. It is, therefore, to be understood that my invention is not to be limited to the specific details shown and described.

Having thus described my invention, what I claim is:

1. A non-coherent moving target indicator including in combination means for periodically transmitting signal pulses, a pair of spaced devices for receiving reflections of the transmitted signal, means for determining the relative phase shift between reflected signals received by the pair of devices, means for storing a representation of the relative phase shift existing at a predetermined time after each transmitted pulse, a high-pass filter providing an output, means coupling the storage means to the filter, and means for sampling the output of the filter at said time after each transmitted pulse, 2. A moving target indicator including in combination means for transmitting signal pulses, a pair of spaced devices for receiving reflections of the transmitted signal, a phase detector responsive to the receiving devices, means providing a time delay, a first gate, a second gate, a capacitor, a high-pass filter, an amplitude detector, means responsive to transmitted pulses for exciting the delay means, means including the first gate for coupling the phase detector to the capacitor, means including the filter and the amplitude detector for coupling the capacitor to the second gate, and means responsive to the delay means for synchronously actuating the first and second gates.

References Cited

UNITED STATES PATENTS

| 3,201,789 | 8/1965 | Fine | 343—7.7 |
| 3,303,503 | 2/1967 | Stabilito | 43—16 X |
| 3,316,549 | 4/1967 | Hallendorff | 43—7.4 |

RODNEY D. BENNETT, JR., Primary Examiner

J. P. MORRIS, Assistant Examiner

U.S. Cl. X.R.

343—17.5